United States Patent
Kinley

[11] 3,758,145
[45] Sept. 11, 1973

[54] FISHING TOOL
[76] Inventor: Myron M. Kinley, 103 Maple Lane Ave., Chickasha, Okla. 73018
[22] Filed: Feb. 23, 1972
[21] Appl. No.: 228,517

[52] U.S. Cl......... 294/86.29, 294/86.18, 294/86.22, 294/86.23, 294/86.3
[51] Int. Cl............................................. E21b 31/12
[58] Field of Search................... 294/86.1, 86.18, 294/86.22, 86.23, 86.25, 86.28, 86.29, 86.3; 166/98, 224, 99

[56] References Cited
UNITED STATES PATENTS

| | | | |
|---|---|---|---|
| 1,538,406 | 5/1925 | McCarty et al............. | 294/86.29 X |
| 2,907,391 | 10/1959 | Kinley................... | 166/224 |
| 1,721,880 | 7/1929 | Henderson................. | 294/86.29 X |
| 1,801,456 | 4/1931 | Pryor..................... | 294/86.29 X |

Primary Examiner—Richard E. Aegerter
Assistant Examiner—Johnny D. Cherry
Attorney—Pravel, Wilson & Matthews

[57] ABSTRACT

A fishing tool adapted to be lowered, raised and manipulated to retrieve cables, wirelines, tubing, tools or other fish or junk from a well, wherein means are provided to automatically release the gripping action on the fish when a predetermined gripping force is applied thereto for thereby preventing damage to the tool from the application of excess torque.

10 Claims, 6 Drawing Figures

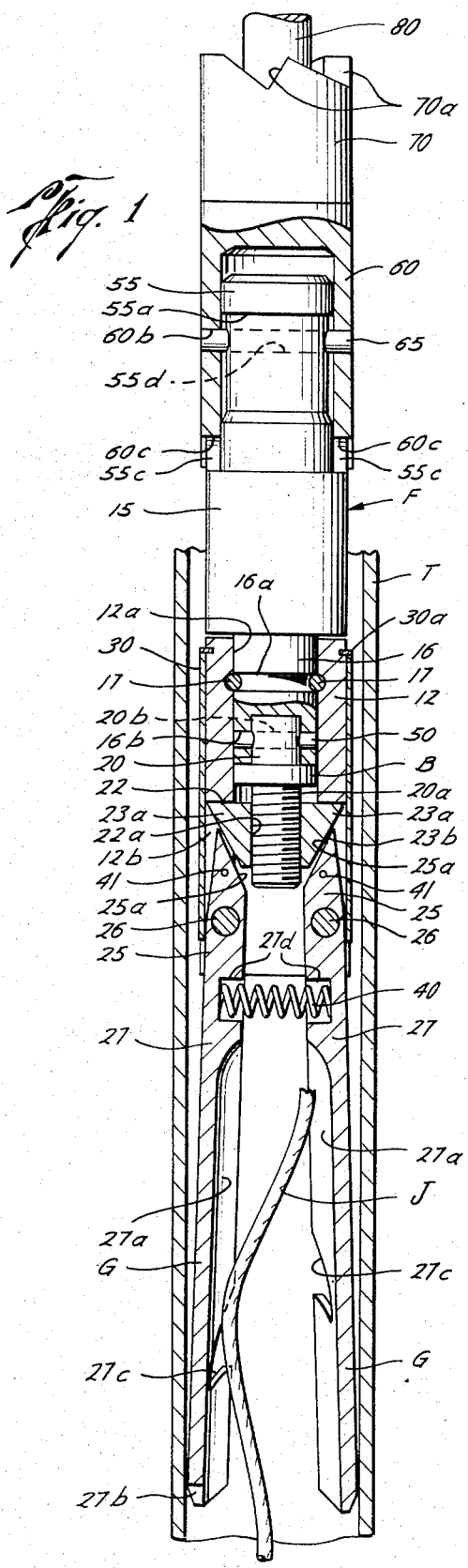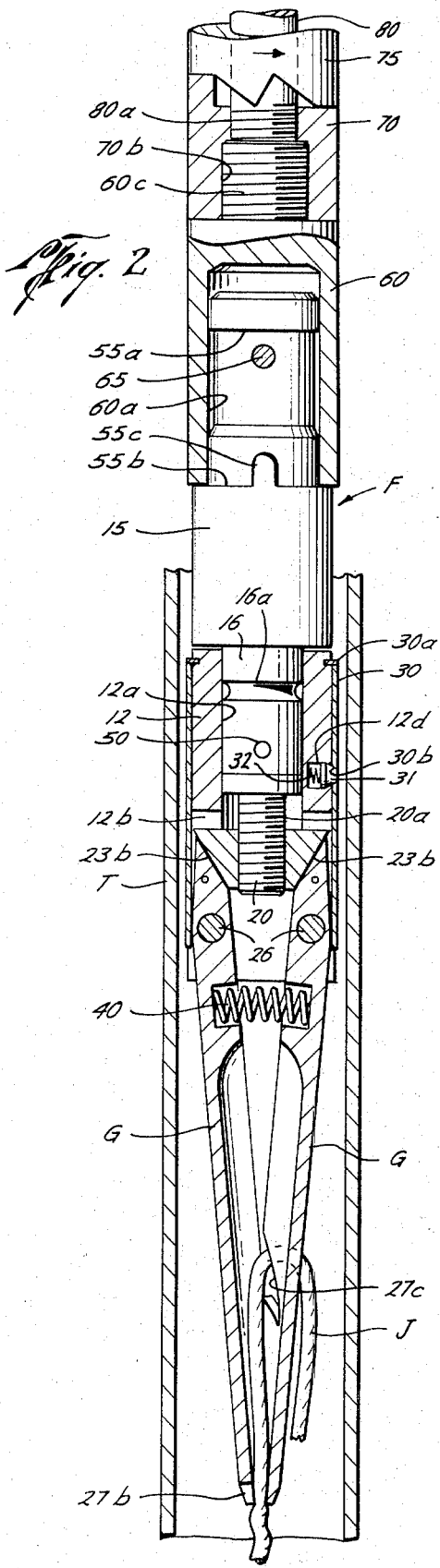

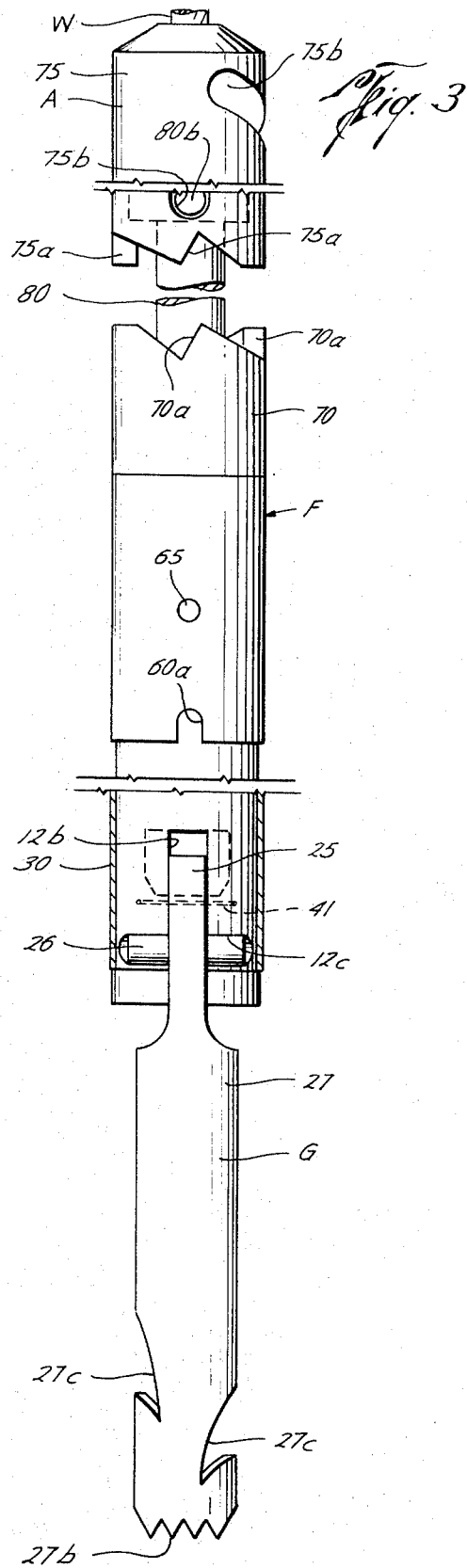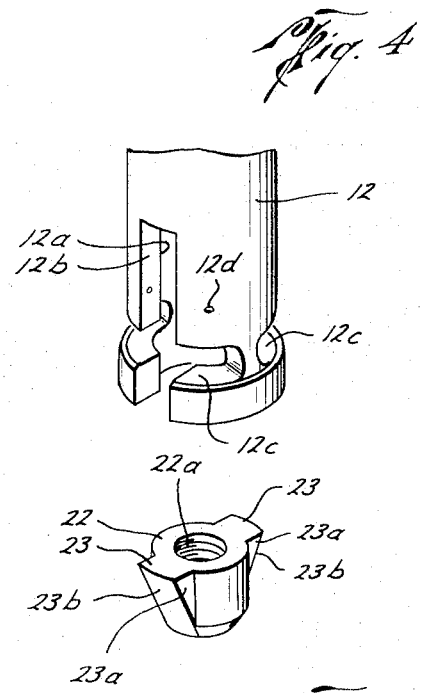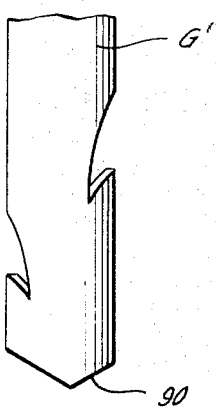

FISHING TOOL

BACKGROUND OF THE INVENTION

The field of this invention is fishing tools for retrieving junk or fish from a well.

Various tools for fishing junk or fish from a well have been known and used in the past, examples of which are shown in U. S. Pat. Nos. 1,732,563; 1,750,728; 1,761,463; 2,280,422; 2,508,422; 2,605,131; 2,652,281; 2,872,238; 2,908,525. Such tools are controlled by an operator at the surface so that it is usually difficult, if not impossible, to determine when a sufficient gripping force has been applied to the fish. As a result, the manipulation of the tool may be discontinued prior to applying sufficient gripping force to hold the fish during retrieval from the well, or an unnecessarily excessive gripping force may be applied to the fish, causing breakage of the tool gripping members or other damage to the tool.

SUMMARY OF THE INVENTION

The present invention relates to a new and improved fishing tool for gripping and retrieving junk or fish from a well, wherein means are provided for automatically developing sufficient gripping force to hold the fish while preventing the application of excessive torque on the tool parts, whereby the fish is adequately gripped without damaging the tool. Additionally, the tool of this invention may be supported and actuated by either a tubing string or wireline. Means are provided for releasing the upper portion of the tool and its supporting tubing or wireline from at least the tool gripping members so as to effect a removal of the wireline or tubing and a portion of the tool from the well in the event the fish cannot be pulled after it has been gripped by the gripping members.

BRIEF DESCRIPTION OF THE DRAWINGS

FIG. 1 is a vertical sectional view, partly in elevation, illustrating the fishing tool of this invention in a well pipe, with the gripping fingers in an open position prior to gripping a fish or piece of junk in the well;

FIG. 2 is a view similar to FIG. 1, but illustrating the tool after it has been actuated to the gripping position, wherein the fish is gripped by the gripping fingers and is ready for retrieval from the well;

FIG. 3 is an elevation, partly in section, illustrating further details of the tool shown in FIGS. 1 and 2 prior to inserting the tool into a well;

FIG. 4 is an isometric view of a portion of the body of the tool of FIGS. 1-3, illustrating in particular a guide slot and a pivot pin slot therein;

FIG. 5 is an isometric view illustrating the preferred actuating member used in the tool of FIGS. 1-3; and FIG. 6 is a view illustrating a modified form of the gripping finger shown in FIGS. 1-3.

DESCRIPTION OF THE PREFERRED EMBODIMENTS

In the drawings, the letter F designates generally the fishing tool of this invention which is adapted to be lowered on a wireline W (FIG. 3) into a well pipe or well bore T in a well for the purpose of gripping and retrieving a piece of junk or fish J in the well. The fishing tool F is actuated by a rotary impact or jarring tool A, preferably of known construction as illustrated in U. S. Pat. Nos. 2,739,654 or 2,907,391. With the present invention, an operator at the surface may manipulate the wireline W so as to grip the junk or fish J with a predetermined gripping force which is normally sufficient for the retrieval of the junk J from the well, and which gripping force is applied without creating an excessive force on the gripping fingers G, whereby damage to the gripping fingers G and other parts of the tool F is prevented, as will be more fully explained.

Considering the invention more in detail, the fishing tool F includes a tubular body 12 which has a longitudinal bore 12a formed therein. The body 12 also has a guide slot 12b for each of the gripping fingers G, as will be more evident hereinafter. Such guide slots 12b extend longitudinally for a portion of the length of the body 12 and they open at the lower end of such body 12 (FIG. 4). In connection with each of the guide slots 12b, a laterally extending pivot pin slot 12c is formed in the body 12, substantially at right angles to each guide slot 12b, and preferably disposed so that the guide slot 12b essentially bisects such slot 12c.

A rotatable mandrel 15 having a reduced diameter mandrel section 16 is mounted with the body 12 for rotation relative thereto. Any suitable connection is provided between the mandrel 15 and the body 12, and as illustrated in FIGS. 1 and 2, such connection is provided by an annular groove 16a which is formed in the mandrel portion 16 and which receives a pair of straight retaining pins 17 which extend through the body 12 and into a portion of the recess 16a so as to prevent relative longitudinal movement between the body 12 and the mandrel 15, while permitting rotational movement of the mandrel 15 with respect to the body 12.

An actuating means B is provided for connection with the mandrel 15, as will be explained, for converting rotational movement of the mandrel 15 into longitudinal movement so as to effect a pivoting of the gripping members G. Thus, the actuating means B includes a rotatable shaft 20 which has threads 20a formed on its lower external surface and which are in engagement with internal threads 22a in an actuating member 22.

The actuating member 22 has an expander section 23 for each of the gripping members G. Each of such expander sections 23 is preferably formed with longitudinally extending flat sides 23a so that the sides 23a for each section 23 fit into and are guided by the sides of one of the longitudinal slots 12b in the body 12. Each of the expander sections 23 also has a downwardly and inwardly inclined expander surface 23b which is engageable with a similarly downwardly and inwardly inclined surface 25a on the upper end 25 of each of the fingers G. The upper end 25 of each finger G is disposed in one of the slots 12b (FIG. 3) and is confined thereby for pivotal movement, as will be explained. Each finger G also has a pivot pin 26 formed integrally with the finger G, or welded or otherwise secured thereto for positioning in one of the pivot pin recesses 12c of the body 12.

Each finger G has a lower portion 27 which is below each of the pivot pins 26 and which has a curvature and other configurations for enhancing the gripping action by the fingers G on the typical pieces of junk or fish J which are encountered in a well. For example, the fish or junk J illustrated in the drawings is a piece of wireline or cable, which is often very difficult to grasp. The inner curved surface 27a of each of the lower finger sections 27 serves to confine, and facilitate the gripping of, the fish or junk J, particularly at the lower end where serrations 27b are provided. Also, notches 27c may be provided in staggered relationship as shown in the drawings for facilitating a gripping and retaining of the junk or fish J. Ridges or knurling (not shown) may be provided on the inner curved surface 27a of each of the fingers G to further facilitate the holding action by the gripping fingers G when they have reached their gripping position (FIG. 2).

The finters G are preferably releasably mounted on the body 12 by a retaining cylinder 30 which is of sufficient length to extend around the upper portion of the body 12 above the slots 12b and also downwardly to the area of the slots 12b in proximity to the pivot pins 26. A snap ring 30a is used to position the cylinder 30 at its upper limit in use. Such sleeve 30 may be mounted by sliding same upwardly over the fingers G.

Normally, the cylinder 30 is prevented from shifting relative to the body 12 by a spring-loaded button 31 (FIG. 2) which is urged outwardly in a body recess 12d by a spring 32 and into an opening 30b in the cylinder 30.

As will be more evident hereinafter, during the running in of the tool F, the actuating member 22 is in the raised position of FIG. 1 and a resilient member such as a spring 40, which is mounted in suitable recesses 27d in the opposite gripping members G, acts to urge the gripping members G to the open position with the surfaces 25a in engagement with the surfaces 23b. To assure the holding of such fingers G in the extended open position during the running in of the tool F, it is preferable to provide shear pins 41 which extend through the upper portions 25 of the fingers G and the body 12. For this purpose, a laterally extending hole 12d (FIG. 4) is provided for each pin 41. To normally facilitate the assembly of the cylinder 30 while still exposing the upper portions 25 of the gripping fingers G for the mounting of the pins 41, the snap ring 30a may be inserted after the pins 41 and thus the cylinder 30 may be pushed upwardly above the location of the pins 41 during the insertion of such pins 41. Thereafter, the cylinder 30 may be moved downwardly on the body 12 to position the retaining pin 31 in the opening 30b, and then the snap ring 30a may be applied. The snap ring 30a may be omitted if desired since the pin 31 normally will adequately hold the cylinder 30 in position until the cylinder 30 is intentionally released by the depressing of the pin 31 inwardly out of the hole 30b. Also, it will be appreciated that other means besides the pins 41 may be employed for holding the gripping member G apart in the open position during the running of the tool F.

During the normal actuation of the actuating means B from the raised position of FIG. 1 to the lowered position of FIG. 2, the driving connection between the mandrel stem 16 and the rotatable shaft 20 of the actuating means B is a shear pin 50 which extends through a lateral opening 20b in the rotatable shaft 20 and aligned openings 16b in the mandrel stem 16. The strength of the pin 50 is predetermined so that when a predetermined torque is developed at such pin 50 as a result of the fingers G having moved to the gripping position of FIG. 2, the pin 50 is sheared or severed by a rotation of the mandrel stem 16 relative to the rotatable shaft 20. Such shearing or severing of the pin 50 thereafter permits a rotation of the stem 15 independently of the rotatable shaft 20, but at the same time, the gripping members G are locked in their gripping position by reason of the actuating member 22 being held by the actuating shaft 20 in the lower position relative to the fingers G (FIG. 2).

The upper end of the mandrel 15 is formed with an upper mandrel extension 55 which is a conventional fishing neck having a shoulder 55a adapted to be engaged by a conventional fishing tool. The diameter of the upper mandrel extension 55 is preferably less than the diameter of the mandrel 15 itself, thereby forming a lower shoulder 55b at the junction between the main portion of the mandrel 15 and the mandrel extension 55. One or more drive lugs 55c are formed at such shoulder 55b for engagement with the walls of corresponding slots 60a formed in the lower end of a connector sleeve 60. The connector sleeve 60 has an external diameter substantially equal to the external diameter of the mandrel 16 and it has an internal diameter at its bore 60a which is slightly larger than the external diameter of the upper mandrel extension 55 so that the sleeve 60 is adapted to fit over the upper mandrel extension 55 and cover same during normal usage. The sleeve 60 is connected to the fishing neck or mandrel extension 55 by a shear pin 65 which extends through an opening 55d in the mandrel extension 55 and also through aligned openings 60b in the sleeve 60. During normal usage, when the sleeve 60 is rotated, its rotational movements are transmitted to the mandrel 15 by the coaction between the walls of the slots 60c and the drive lugs 55c. The shear pins 65 could be strong enough to take such rotational movement, but normally it is desirable to use the drive lugs 55c for taking the drive load. The shear pin 65 prevents an upward longitudinal movement of the sleeve 60 relative to the mandrel 15 and the mandrel extension 55 until a predetermined upward jarring force is applied thereto. This occurs when the tool F is gripping a fish or piece of junk J which cannot be pulled upwardly because such fish or junk J is stuck in the well. By shearing the pin 65, the sleeve 60 is thus removed from the mandrel 15 and the mandrel extension 55 to expose the fishing neck thereof so that subsequently a conventional fishing tool may be lowered for engaging with the shoulder 55a of the fishing neck or mandrel extension 55. Thereafter, subsequent manipulations of such conventional fishing tool may accomplish the pulling of the fish J from the well with the tool F.

The rotary movement of the connector sleeve 60 and thus the mandrel 15 and the rotatable shaft 20 are accomplished by a wireline actuated rotary jarring tool, a portion of which is illustrated in the drawings, and the details of which are shown in U. S. Pat. Nos. 2,739,654 and 2,907,391. As partially illustrated in the drawings, the actuating or jarring tool A includes an anvil section 70 which has a plurality of inclined anvil surfaces 70a which are adapted to be contacted by hammer surfaces 75a on a hammer section 75 which is supported by the wireline W. For guiding the hammer section 75 to cause it to rotate relative to the anvil section 70, a support rod 80 is threaded at 80a, or is otherwise connected to the hammer section 70 (FIG. 2). The support rod 80 has one or more guide pins 80b disposed near its upper end for disposition in one or more spiral slots or grooves 75b, a portion of which is illustrated in FIG. 3, and which is more fully illustrated in the above-identified U. S. patents.

When the hammer section 75 is lowered towards the anvil section 70, the downward movement of the hammer section 75 is translated into rotary movement by the travel of the slot 75b relative to the pin 80b. The assembly of the hammer section 75 and the anvil section 70 is arranged so that the surfaces 75a engage the surfaces 70a while the hammer section 75 is rotating, to thus impart a blow or jar in a rotary direction from the hammer section 75 to the anvil section 70. The anvil section 70 is fastened to the connector sleeve 60 by any suitable means such as left hand threads 70b (FIG. 2) which engage a left hand threaded stud 60c welded or otherwise secured to the upper end of the connector sleeve 60, assuming the threads 20a are right hand threads. Thus, the rotational movement imparted to the anvil section 70 is transmitted to the connector sleeve 60 and then through the shear pin 65 to the mandrel 15. As previously explained, rotational movements of the mandrel 15 are transmitted to the stem 16 and them to the threaded shaft 20 for causing the expander member 22 to move downwardly.

Thus, in the use or operation of the fishing tool F of this invention, it is lowered into the well pipe T or well bore so as to locate the upper end of the fish or junk J between the gripping fingers G as illustrated in FIG. 1. During such lowering of the fishing tool F, the gripping fingers G are retained in their outer open position by the shear pins 41 or any other suitable retaining means. When the operator feels that the gripping fingers G have encountered the fish or junk J by reason of the resistance offered to further downward movement of the tool F, the operator then begins to manipulate the wireline W by raising it sufficiently to raise the upper hammer section 75 and then lowering it for obtaining the jarring action heretofore described by the contact of the surfaces 75a with the surfaces 70a. The rotational movement thus imparted through the wireline actuating jarring tool A to the rotatable shaft 20 causes the expander member 22 to move longitudinally relative to the body 12. The body 12 is frictionally held sufficiently by the engagement of the gripping fingers G with the inside of the tubing T to prevent it from rotating with the mandrel stem 16 and the shaft 20, at the beginning of the movement of the gripping fingers G inwardly. After the gripping fingers G have moved inwardly so that they no longer frictionally engage the inside of the tubing T, there is generally sufficient resistance towrds rotational movement provided by the interference from the fish or junk J so that the fingers G and therefore the body 12 are frictionally held against rotational movement during the rotation of the mandrel 15 and the rotatable shaft 20. Thus, the gripping fingers G do not rotate, but they are pivoted about their pivot pins 26 as the expander member 22 is moved downwardly in contact with the surfaces 25a. The spring 40 maintains the contact between the surfaces 25a and the external expander surfaces 23b of the expander member 22 during the movement of the gripping fingers G inwardly from the open position of FIG. 1 to the gripping position represented in FIG. 2. It will be appreciated that the cable or wireline, shown in FIGS. 1 and 2 as the fish or junk J is relatively small in size and the fish may of course be much larger than the cable J which is illustrated in the drawings. In some instances, it may be desirable to provide a bow spring or other means to frictionally engage the inside of the tubing T with the body 12 so as to prevent rotation thereof and thus to prevent rotation of the gripping fingers G when the mandrel 15 and the parts therewith are rotated. Normally, this is not necessary and therefore, this has not been illustrated.

When the gripping fingers G have engaged the fish J so that they grip it with sufficient gripping force to retrieve it from the well, assuming that it is not stuck in the well, a torque is developed at the connector pin 50 when the rotary impacts are applied to the pin 50 by the mandrel stem 16 in response to the jarring action from the jarring tool A. When the expander member 22 is in the position shown in FIG. 2, it will be appreciated that further downward movement thereof is virtually prevented and is resisted as a result of the gripping engagement of the fingers G with the fish J. Since the further downward movement of the expander member 22 is thus resisted, rotation of the shaft 20 is virtually stopped and a relatively high torque force is developed on the connector pin 50 for each rotary blow imparted to the stem 16 through the jarring tool A. The amount of resistance provided by the pin 50 is predetermined by the strength of such pin so that such pin shears or severs when a predetermined torque thereon is developed or created.

After the severing or shearing of the pin 50 occurs, further rotation of the stem 16 occurs without transmitting any force to the rotatable shaft 20 and without further increasing the gripping action on the junk J by the gripping fingers G. Thus, the gripping force is automatically predetermined and is locked into position by the expander member 22 engaging the upper ends of the gripping fingers G as shown in FIG. 2. In such manner, the fishing tool F of this invention accomplishes a sufficient gripping of the junk J to retrieve same, but at the same time, the forces applied to the gripping fingers G do not become so excessive that they casue damage to such fingers G or any other parts of the fishing tool F.

After the gripping fingers G have thus gripped the fish J, the wireline W is pulled upwardly to pull the entire fishing tool F upwardly with the fish J therewith. In the event the fish J is stuck in the well and upward movement of the fishing tool F is prevented by reason of such stuck fish, the operator may jerk upwardly with the wireline W with a sufficient force to shear the pin 65 and then the wireline with the tool A is removed from the well pipe T. Such removal of the wireline W also removes the connector sleeve 60 so as to leave the mandrel extension or fishing neck 55 exposed to receive a conventional fishing tool which may be lowered to grip the fishing neck at the shoulder 55 in the known manner. Conventional fishing tools can be used thereafter to impart vertical jarring actions which may release the stuck fish J to enable the removal of the tool F with the stuck fish J.

Variations in the fishing tool F may be included within the scope of this invention. For example, each gripping finger G may be modified as illustrated by the lower portion of the gripping finger G' in FIG. 6, wherein the lower end is pointed at 90 rather than having the serrations 27b. Also, instead of using the wireline W and the jarring tool A, the upper end of the sleeve 60 may be connected to a tubing string for support and manupulation. In that event, the threads 60c and 70b are preferably right hand threads and the threads 20a are left hand threads so that the tubing string can be rotated to the right, or clockwise as viewed by looking down from the surface, without releasing the threads 60c and 70b while moving the gripping fingers G to the gripping position.

I claim:

1. A fishing tool for retrieving junk from a well, comprising:
   a body adapted to be supported in a well;
   a plurality of gripping fingers for gripping junk in a well;
   pivotal connection means mounting said fingers on said body for pivotal movement from an open position for dispostion over a piece of junk to a gripping position in gripping engagement with the junk;
   actuating means with said body and coacting with said fingers for pivoting same from the open position to the gripping position upon rotation of a mandrel;
   drive means for imparting rotational movement to said actuating means for effecting said pivoting of said fingers; and
   release connection means releasably connecting said drive means to said actuating means for automatically releasing said drive means from said actuating means and for discontinuing the pivoting of said fingers by said actuating means when a predetermined gripping force is applied to the junk by the gripping fingers, whereby an adequate gripping force is applied to the junk without damaging the parts of the tool by applying excessive force to the gripping fingers.

2. The structure set forth in claim 1, wherein said drive means includes:
   a wireline manipulated rotary jarring tool supported by a wireline; and
   means for transmitting jarring blows from said rotary jarring tool to said actuating means for effecting the pivotal movements of said gripping fingers to the gripping position.

3. The structure set forth in claim 2, wherein:
   said rotary jarring tool has an anvil section connected to said connector sleeve, and a hammer section which has a substantially spiral guide slot in which a guide pin is disposed for causing said hammer section to rotation as it is lowered relative to said guide pin and until it contacts said anvil section for imparting a rotary blow thereto.

4. The structure set forth in claim 1, including:
   a fishing neck on the upper end of said body;
   a connector sleeve surrounding said fishing neck;
   a driving connection between said connector sleeve and said fishing neck for transmitting rotational movement of said connector sleeve to said fishing neck but releasable upon an upward movement of said connector sleeve relative to said fishing neck; and
   a shearable connection between said connector sleeve and said fishing neck for preventing an upward movement of said connector sleeve relative to said fishing neck until a predetermined upward pull is applied to said connector sleeve for releasing same from said fishing neck to thereby expose said fishing neck for engagement by a conventional fishing tool.

5. The structure set forth in claim 1, wherein:
   said actuating means includes a rotatable shaft and an actuating member threaded thereto which has an external expander section for engagement with each of said gripping fingers; and
   said body has a slot therein for each expander section of the actuating member to permit longitudinal movement of the actuating member while preventing rotational movement thereof relative to said body whereby rotational movement of said rotatable shaft imparts longitudinal movement to said actuating member.

6. The structure set forth in claim 5, wherein:
   each of said fingers has an extension above said pivotal connection means for engagement with one of said external expander sections on said actuating member for effecting the pivoting of said fingers inwardly as said actuating member moves longitudinally downwardly.

7. The structure set forth in claim 6, including:
   resilient means urging said gripping fingers outwardly towards said open position for constantly maintaining contact between each said expander section of said actuating member and said extension on each gripping finger.

8. The structure set forth in claim 1, wherein:
   said body has a longitudinal guide slot for each of said gripping fingers, and said body also has a laterally extending pivot pin recess disposed on the external surface of said body in a direction substantially perpendicular to said slot; and
   said pivot connection means includes a pivot pin with each of said fingers disposed in one of said pivot pin recesses for pivotal movement therein.

9. The structure set forth in claim 8, including:
   a releasable retaining cylinder disposed over at least a portion of said body and said pivot pins for releasably confining said pivot pins in said pivot pin recesses.

10. The structure set forth in claim 1, wherein:
    said actuating means includes a rotatable mandrel rotatably mounted with said body for rotation relative thereto; and
    said release connection means is releasably connected to said mandrel for normally transmitting rotation of said mandrel to the rest of the actuating means for causing pivotal movements of said gripping fingers, but being releasable upon the application of a predetermined torque to prevent further operation of said actuating means.

\* \* \* \* \*